United States Patent
List et al.

(10) Patent No.: US 9,482,201 B2
(45) Date of Patent: Nov. 1, 2016

(54) METHOD FOR TESTING A SUPPLY CIRCUIT, AND A CORRESPONDING SUPPLY CIRCUIT FOR AT LEAST ONE IGNITION CIRCUIT

(71) Applicant: Robert Bosch GmbH, Stuttgart (DE)

(72) Inventors: Carsten List, Walheim (DE); Hartmut Schumacher, Freiberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/411,333

(22) PCT Filed: May 28, 2013

(86) PCT No.: PCT/EP2013/060978
§ 371 (c)(1),
(2) Date: Dec. 24, 2014

(87) PCT Pub. No.: WO2014/001011
PCT Pub. Date: Jan. 3, 2014

(65) Prior Publication Data
US 2015/0361942 A1 Dec. 17, 2015

(30) Foreign Application Priority Data

Jun. 27, 2012 (DE) .................. 10 2012 210 931

(51) Int. Cl.
*F02P 3/08* (2006.01)
*H02J 7/00* (2006.01)
(Continued)

(52) U.S. Cl.
CPC ........... *F02P 3/0807* (2013.01); *B60R 21/017* (2013.01); *F02D 41/22* (2013.01); *F02P 3/0846* (2013.01);
(Continued)

(58) Field of Classification Search
CPC .... F02P 3/0807; H02J 7/0052; H02J 7/0063; H02J 7/007; H02J 7/345; H02J 2007/0067; Y10T 307/352

USPC ....................................................... 307/24
See application file for complete search history.

(56) References Cited

U.S. PATENT DOCUMENTS 5,432,385 A * 7/1995 Kincaid ............. B60R 21/0173
280/735
7,881,037 B2 * 2/2011 Ueda .................. B60R 21/017
307/10.1

FOREIGN PATENT DOCUMENTS

DE 101 11 252 9/2002
DE 10 2008 012896 9/2009
(Continued)

OTHER PUBLICATIONS

International Search Report for PCT/EP2013/060978, dated Oct. 15, 2013.

*Primary Examiner* — Thienvu Tran
*Assistant Examiner* — Kevin J Comber
(74) *Attorney, Agent, or Firm* — Norton Rose Fulbright US LLP

(57) ABSTRACT

In a method for testing a supply circuit for an ignition circuit having at least one energy accumulator, a first conversion circuit that raises a supply voltage to a specified voltage level and charges the at least one energy accumulator, a controllable discharging circuit that discharges the at least one energy accumulator as needed, the energy accumulator is connected via a first coupling diode to the ignition circuit, and the supply voltage is applied via a second coupling diode to the at least one ignition circuit. Following the system start-up, a state of charge of the at least one energy accumulator is ascertained and compared to the at least one specified threshold value, and as a function of the comparison, a faultless supply circuit or at least one fault is recognized.

25 Claims, 5 Drawing Sheets

(51) Int. Cl.
  *F02D 41/22*  (2006.01)
  *F02P 3/09*   (2006.01)
  *F02P 11/00*  (2006.01)
  *F02P 11/06*  (2006.01)
  *H02H 11/00*  (2006.01)
  *B60R 21/017* (2006.01)
  *H02J 7/34*   (2006.01)

(52) U.S. Cl.
  CPC ............... *F02P 3/09* (2013.01); *F02P 11/00* (2013.01); *F02P 11/06* (2013.01); *H02H 11/002* (2013.01); *H02J 7/007* (2013.01); *H02J 7/0052* (2013.01); *H02J 7/0063* (2013.01); *H02J 7/345* (2013.01); *H02J 2007/0067* (2013.01); *Y02T 10/40* (2013.01); *Y10T 307/352* (2015.04)

(56) References Cited

FOREIGN PATENT DOCUMENTS

| | | |
|---|---|---|
| GB | 2 025 523 | 1/1980 |
| GB | 2 112 857 | 7/1983 |
| JP | 10132882 A | 5/1998 |

\* cited by examiner

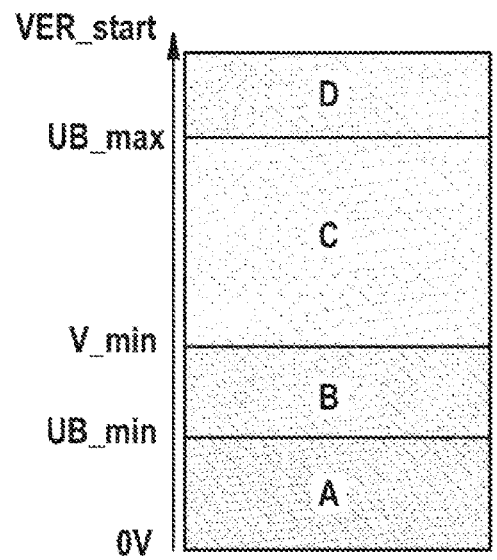
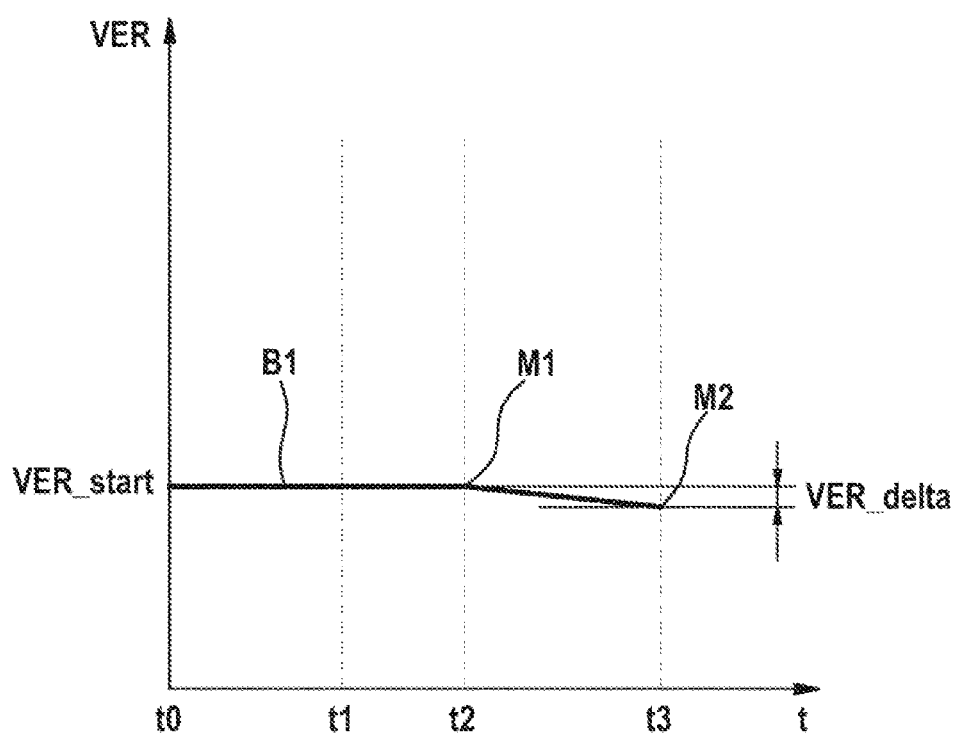
Fig. 3
Fig. 4

METHOD FOR TESTING A SUPPLY CIRCUIT, AND A CORRESPONDING SUPPLY CIRCUIT FOR AT LEAST ONE IGNITION CIRCUIT

BACKGROUND OF THE INVENTION

1. Field of the Invention

The present invention relates to a method for testing a supply circuit for at least one ignition circuit.

2. Description of the Related Art

Occupant protection systems have an ignition circuit configuration that has at least one ignition circuit for activating restraint means. The energy used to activate these restraint means is generally provided from an energy accumulator and/or from a vehicle electrical system that includes an alternator and at least one battery. This means that, when the engine is running, the energy accumulator and/or the alternator and, when the engine is idling, the energy accumulator and/or the battery provide(s) the energy required for activating the restraint means. The ignition circuit configuration for the various restraint means generally includes two circuit blocks that each have a semiconductor output stage and a corresponding driver and/or control circuit. In this case, a high-side ignition circuit is looped into an energy supply line, and the low-side ignition circuit is looped into the feedback line. To enhance the security of the ignition circuit configuration, another semiconductor output stage can be looped centrally into the energy supply line of the high-side ignition circuit.

What are commonly known as semiconductor output stages are generally constituted of power transistors designed as power MOSFETs, each having a source-drain (reverse) diode. To minimize the risk of a false activation, particularly in the case of a supply voltage short circuit in the ignition circuit in the starting phase, the energy accumulator and/or the vehicle system voltage are/is coupled to the ignition circuits in a manner that provides reverse-polarity protection.

BRIEF SUMMARY OF THE INVENTION

In contrast, the method according to the present invention for testing a supply circuit for at least one ignition circuit, as well as a supply circuit for at least one ignition circuit, have the advantage that the blocking ability of reverse-polarity protection elements, respectively of coupling diodes in the ignition-circuit supply circuit is tested and, in the event of a fault, may be displayed. This makes it advantageously possible to prevent the risk of erroneous activation without a previous fault indication.

Specific embodiments of the present invention provide a method for testing a supply circuit for at least one ignition circuit, that includes at least one energy accumulator, a first conversion circuit, which raises a supply voltage to a specified voltage level and charges the at least one energy accumulator, and a controllable discharging circuit that discharges the at least one energy accumulator as needed, the energy accumulator being connected via a first coupling diode to the at least one ignition circuit, and the supply voltage being applied via a second coupling diode to the at least one ignition circuit. In accordance with the present invention, a controllable charging circuit remains deactivated from the time of system start-up until completion of a supply voltage test, and disconnects the at least one energy accumulator from the first conversion circuit; following a system start-up, a state of charge of the at least one energy accumulator being ascertained and compared to at least one specified threshold value; and, as a function of the at least one comparison, a faultless supply circuit or at least one error being recognized.

Moreover, a supply circuit is provided for at least one ignition circuit that includes at least one energy accumulator and a first conversion circuit that raises a supply voltage to a specified voltage level and charges the at least one energy accumulator; between the energy accumulator and the at least one ignition circuit, a first coupling diode being configured; a supply voltage being able to be applied via a second coupling diode to the at least one ignition circuit; and a controllable discharging circuit discharging the at least one energy accumulator as needed. In accordance with the present invention, a controllable charging circuit is looped in between the first conversion circuit and the at least one energy accumulator.

The specified voltage level generated by the first conversion circuit is applied to an input of the second conversion circuit that generates at least an operating voltage for a corresponding controller. Via the controllable charging circuit according to the present invention, the specified increased voltage level may be connected to the at least one energy accumulator and charge the same. In addition, to supply the controller independently of the on-board electrical system (autonomous energy supplying), the charging circuit functioning as an MOS switch may connect the energy accumulator to the second conversion circuit in reverse when the voltage level at the input of the charging circuit is lower than that of the at least one energy accumulator. In addition, a reverse diode, which redundantly connects the at least one energy accumulator to the second conversion circuit, may be configured in parallel to the controllable charging circuit. This makes it possible to compensate for a fault in the charging circuit functioning as an MOS switch.

For example, the supply circuit according to the present invention may be used in an ignition circuit configuration for an occupant safety system and, besides the at least one ignition circuit, include an ignition element that may be ignited by the at least one ignition circuit. The ascertained fault states, respectively the ascertained faultless states may be output to the user via a suitable optical and/or acoustic display means.

It is particularly advantageous that a faultless coupling of the supply circuit to at least one ignition circuit may be recognized when the ascertained state of charge of the at least one energy accumulator falls below a first threshold value. Since, in the case of a defect, respectively fault of the first coupling diode, the energy accumulator is charged by the positive supply voltage of the vehicle via the second coupling diode, a charging voltage, respectively the state of charge of the energy accumulator corresponds to the level of the positive supply voltage of the vehicle, reduced by a conducting-state voltage of the second coupling diode. Thus, in the case of a defect of the first coupling diode, the charging voltage, respectively the state of charge of the energy accumulator corresponds in the lower limiting case to a minimum level of the positive supply voltage of the vehicle, reduced by the forward voltage of the second coupling diode.

Therefore, the first threshold value is preferably specified on the basis of the minimum value of the supply voltage, so that, if this first threshold value is not met, it may be assumed that the fault present in the supply circuit is not a simple one. In one advantageous embodiment of the method according to the present invention, a faulty second conversion circuit or a warm reset error may be recognized when the ascertained state of charge of the at least one energy accumulator exceeds a second threshold value. Since the energy accumulator, as already explained above, is charged by the positive supply voltage of the vehicle via the second coupling diode in the case of a defect, respectively fault of the first coupling diode, a charging voltage, respectively the state of charge of the energy accumulator corresponds to the level of the positive supply voltage of the vehicle, reduced by a forward voltage of the second coupling diode. Thus, in the case of a defect of the first coupling diode, the charging voltage, respectively the state of charge of the energy accumulator corresponds in the upper limiting case to a maximum level of the positive supply voltage of the vehicle, reduced by the forward voltage of the second coupling diode. Since, in addition, no normal, respectively unrecognized faulty supply voltages having a higher level than the maximum level of the nominal charging voltage of the at least one energy accumulator, respectively of the energy reserve may occur in the vehicle, the second threshold value preferably represents the maximum value of the supply voltage that is not faulty, so that, if this second threshold value is exceeded, it may be assumed that a simple fault is present in the second conversion circuit, or a warm reset error is present in the controller, and that the first coupling diode does not have any defect or fault.

In another advantageous embodiment of the method according to the present invention, the discharging circuit may be activated for a specified period of time when the ascertained state of charge of the at least one energy accumulator resides between the first threshold value and a third threshold value; once the specified time period has elapsed, the state of charge of the at least one energy accumulator being newly ascertained.

If the ascertained state of charge of the energy accumulator resides between the first and third threshold value, a defect or fault may then be present in the first coupling diode, or this state may be attributed to a harmless rapid OFF-ON supply cycle. In this case, upon reaching a lower input voltage limit, respectively a minimum input voltage of the second conversion circuit including a subsequent reset state of the controller, the rapid OFF-ON supply cycle prevents a further discharging of the energy accumulator in that the controller operating voltage is switched on again, and no defect or fault is present in the supply circuit, respectively in the first coupling diode. Therefore, the third threshold value preferably represents the minimum value of the input voltage of the second conversion circuit. A comparison with the third threshold value advantageously makes it possible to further limit an occurring fault or to recognize a faultless supply circuit. Thus, for example, a defective first coupling diode may be recognized when, once the specified time period has elapsed, no reduction in the state of charge of the at least one energy accumulator is ascertained as a result of the discharging circuit being activated for test purposes in the case of a deactivated charging circuit. This means that the newly ascertained state of charge of the energy accumulator corresponds to the state of charge of the energy accumulator determined at system start-up. A faultless supply circuit may be recognized when, once the specified time period has elapsed, a reduction in the state of charge is ascertained, and the state of charge of the at least one energy accumulator ascertained at system start-up resides between the first threshold value and the third threshold value.

A faulty second conversion circuit or a warm reset error may be advantageously recognized when, once the specified time period has elapsed, a reduction in the state of charge of the at least one energy accumulator is ascertained as a result of the discharging circuit being activated for test purposes in the case of a deactivated charging circuit, and the state of charge of the at least one energy accumulator ascertained at system start-up resides between a third threshold value and the second threshold value. If the state of charge of the energy accumulator resides between the third threshold value and the second threshold value, then either the second conversion circuit or the reset structure of the controller is defective, since it is then possible to rule out a simple defect, respectively fault in the first coupling diode due to the ascertained difference in the charging voltage. Since the harmless rapid OFF-ON supply cycle may be ruled out when the charging voltage, respectively the state of charge of the energy accumulator is above the minimum input voltage of the second conversion circuit, a faulty second conversion circuit or a warm reset error in the controller may be inferred. Therefore, the third threshold value preferably represents the minimum value of the input voltage of the second conversion circuit.

One advantageous embodiment of the supply circuit according to the present invention provides that a reverse diode be configured in parallel to the controllable charging circuit and redundantly connect the at least one energy accumulator to the second conversion circuit, which, from an input voltage, is able to generate at least one further operating voltage for a controller. This advantageously enables energy to be supplied to the second conversion circuit, respectively the controller, autonomously from the supply voltage of the vehicle, from the at least one energy accumulator via the reverse diode that is redundant to the charging circuit, making it advantageously possible to compensate for a fault in the charging circuit functioning as an MOS switch.

In another advantageous embodiment of the supply circuit according to the present invention, an evaluation and control unit drives the charging circuit and/or the discharging circuit in order to charge or discharge the at least one energy accumulator as needed. Moreover, the evaluation and control unit is able to implement a method according to the present invention for testing a supply circuit for at least one ignition circuit.

Exemplary embodiments of the present invention are illustrated in the drawing and are explained in greater detail in the following description. In the drawing, components, respectively elements that perform identical or analogous functions are denoted by the same reference numerals.

BRIEF DESCRIPTION OF THE DRAWINGS

FIG. 3 is a schematic representation of various ranges of a state of charge ascertained at system start-up of at least one energy accumulator of the supply circuits according to the present invention for at least one ignition circuit from FIG. 1 or FIG. 2.

FIG. 4 through 7 each show a characteristic diagram of a state of charge of the at least one energy accumulator of the supply circuits according to the present invention from FIG.

1 for various fault cases during implementation of the method according to the present invention for testing a supply voltage.

DETAILED DESCRIPTION OF THE INVENTION

Figure 1:
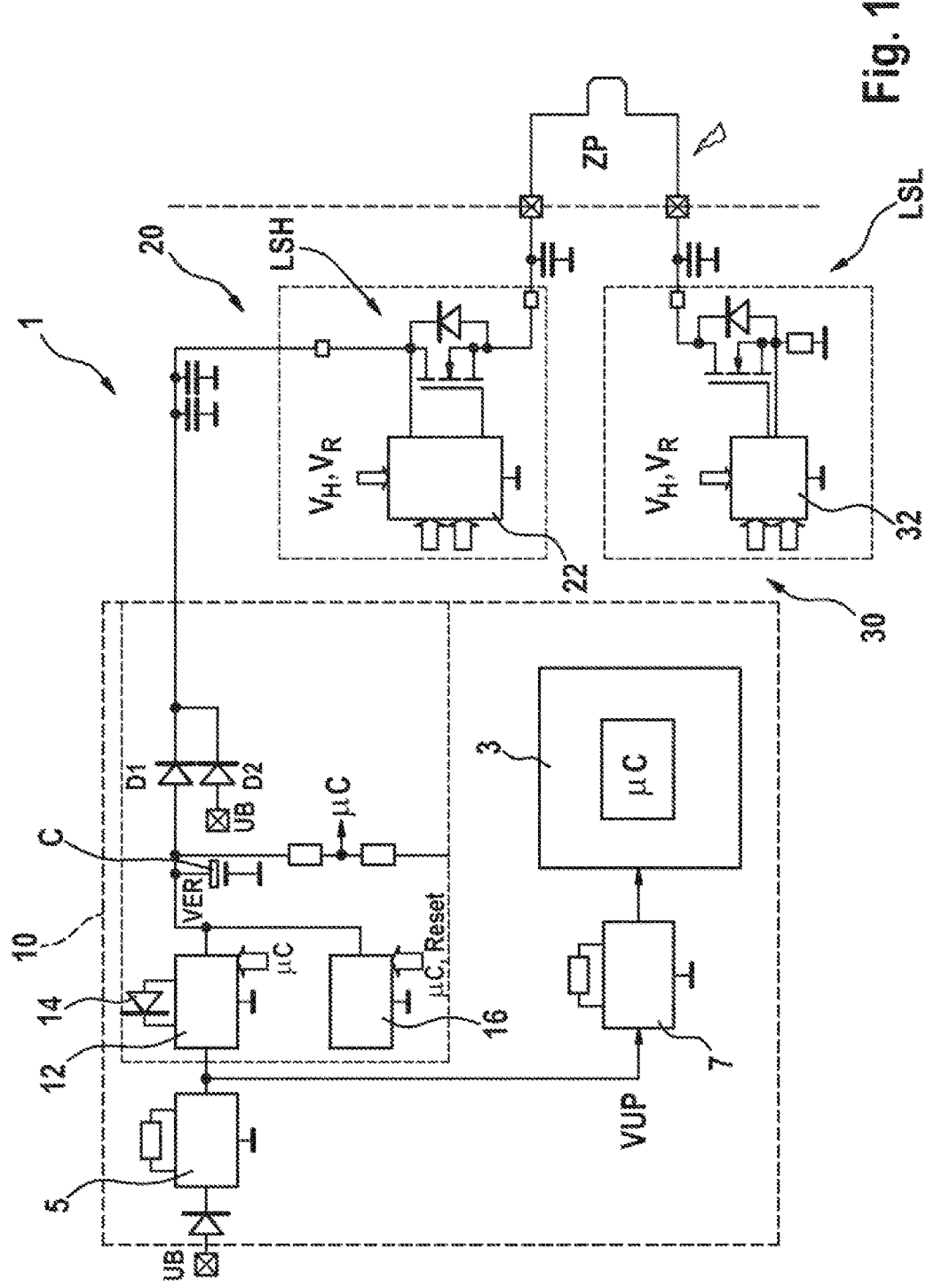
FIG. 1 shows a schematic block diagram of a first exemplary embodiment of a supply circuit according to the present invention for at least one ignition circuit of an occupant protection system.
Figure 2:
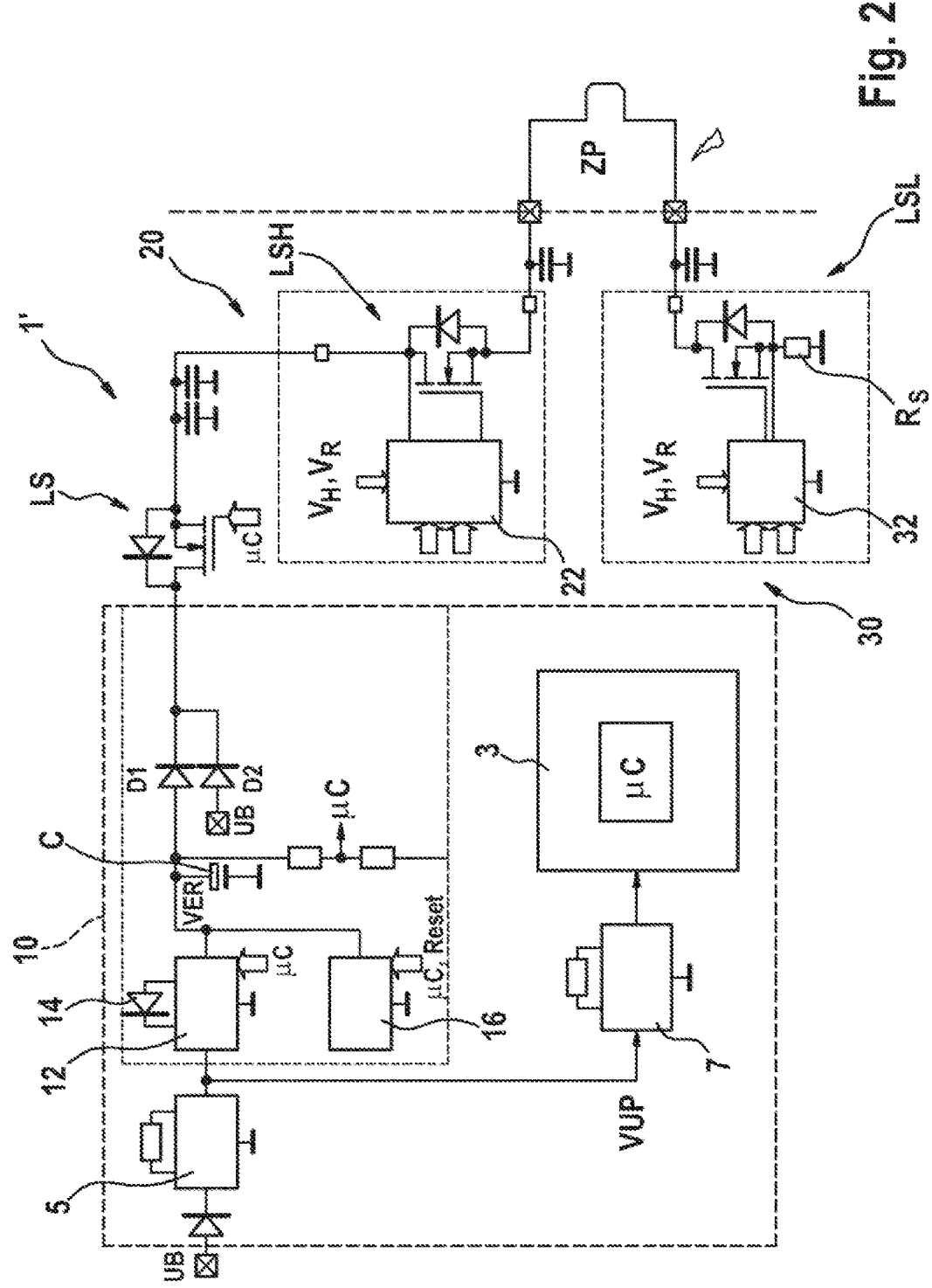
FIG. 2 shows a schematic block diagram of a second exemplary embodiment of a supply circuit according to the present invention for at least one ignition circuit of an occupant protection system.

As is readily apparent from FIGS. 1 and 2, a supply circuit 10 according to the present invention for at least one ignition circuit 20, 30 includes at least one energy accumulator C and a first conversion circuit 5 that raises a supply voltage UB of a vehicle electrical system to a specified voltage level VUP and charges the at least one energy accumulator C, as well as a second conversion circuit 7 connected downstream. During normal operation, second conversion circuit 7 generates at least one operating voltage for a corresponding controller 3 from an essentially constant input voltage VUP, respectively in an operation that is autonomous from supply voltage UB, from charge voltage VER stored in at least one energy accumulator C. Configured between energy accumulator C and the at least one ignition circuit 20, 30 is a first coupling diode D1, and a supply voltage UB is able to be applied via a second coupling diode D2 to the at least one ignition circuit 20, 30. A controllable discharging circuit 16 discharges the at least one energy accumulator C as needed. In accordance with the present invention, a controllable charging circuit 12 is looped in between first conversion circuit 5 and the at least one energy accumulator C. The at least one energy accumulator C is charged from first conversion circuit 5 via charging circuit 12 that is controllable, for example, by an evaluation and control unit of controller 3 that is preferably in the form of a microcontroller (μC). At the end of the charging process, a voltage level VER of the at least one energy accumulator C, which is also referred to as an energy reserve, essentially corresponds to voltage level VUP generated from supply voltage UB. In the case of inactive charging circuit 12, discharging circuit 16 is automatically controlled in the reset state of controller 3 and, otherwise likewise by microcontroller (μC) of controller 3, for example.

As is also readily apparent from FIGS. 1 and 2, a reverse diode 14 is configured in parallel to controllable charging circuit 12. Reverse diode 14 constitutes a redundant passive coupling of the at least one energy accumulator C to second conversion circuit 7, which generates at least one further operating voltage for controller 3 from an input voltage in an operation that is autonomous from supply voltage UB, in which voltage level VER of the at least one energy accumulator C is greater than voltage level VUP generated from supply voltage UB, and maintains it for a specified period of time. In an operation that is autonomous from supply voltage UB, a charging current controller of charging circuit 12 that is configured between first conversion circuit 5 and the at least one energy accumulator C, having an MOS field effect transistor as a main switch, functions as a conductive switch to which reverse diode 14 is connected in parallel to make available the redundant connection between first conversion circuit 5 and the at least one energy accumulator C. During normal operation, i.e., outside of the operation that is autonomous from supply voltage UB, evaluation and control unit μC drives controller 3 and charging circuit 12 and/or discharging circuit 16 in order to charge or discharge the at least one energy accumulator C as needed.

As is readily apparent from FIGS. 1 and 2, the illustrated exemplary embodiments of an ignition circuit configuration 1, 1' according to the present invention for an occupant safety system each include at least one ignition circuit 20, 30 for activating restraint means via at least one ignition element ZP that may be ignited by the at least one ignition circuit 20, 30, and a supply circuit 10 according to the present invention that energizes the at least one ignition circuit 20, 30. The energy used to activate these restraint means via ignition element ZP may be provided from energy accumulator C and/or from the vehicle electrical system that includes an alternator and at least one battery which provides supply voltage UB. This means that, when the engine is running, energy accumulator C and/or the alternator, and, when the engine is idling, energy accumulator C and/or the battery provide(s) the energy required for activating the restraint means. It is self-evident that specific embodiments of the ignition circuit configuration according to the present invention may have any desired number of ignition circuits 20, 30 that may be energized via specific embodiments of supply circuit 10 according to the present invention.

In the case of the illustrated exemplary embodiments, ignition circuit configurations 1, 1' each include a high side block 20 and a low side block 30, that each have a semiconductor output stage LSH, LSL and a corresponding driver and/or control circuit 22, 32. In this case, a high-side output stage of high side block 20 is looped into an energy supply line of ignition element ZP, and a low-side output stage of low side block 30 is looped into the feedback line of ignition element ZP. Semiconductor output stages LSH, LSL are realized as power transistors in the form of power MOSFETs that each have a source-drain (reverse) diode. The driver and/or control circuits 22, 32 are controlled by evaluation and control unit μC of controller 3 in order to supply ignition element ZP with energy and trigger an ignition, whereby a corresponding restraint means is activated. In addition, driver and/or control circuits 22, 32 may each receive auxiliary variables $V_H$, such as analog and digital auxiliary voltages and/or reference variables $V_R$, such as reference currents and/or reference voltages, for example, for controlling semiconductor output stages LSH, LSL. To minimize the risk of a false activation, particularly in the case of a supply voltage short circuit in the feedback line of ignition element ZP in one of ignition circuits 20, 30 in the starting phase, energy accumulator C and/or supply voltage UB from the vehicle electrical system are/is coupled in a manner that provides reverse-polarity protection, in each case via a coupling diode D1, D2, to ignition circuits 20, 30 and, thus, to ignition element ZP.

The difference between a first exemplary embodiment of ignition circuit configuration 1 according to the present invention illustrated in FIG. 1 and a second exemplary embodiment of the ignition circuit configuration 1' according to the present invention illustrated in FIG. 2 resides in a further semiconductor output stage LS that is looped centrally into the energy supply line of high side block 20 to enhance the security of ignition circuit configuration 1'. The further semiconductor output stage LS is likewise realized as a power transistor in the form of a power MOSFET, which, because of the design, also has a source-drain (reverse) diode and is controlled by evaluation and control unit μC of controller 3. Supply circuit 10 and ignition circuits 20, 30, respectively high side blocks 20 and low side blocks 30 are identical in design in both exemplary embodiments.

In an intact ignition circuit configuration known from the related art, the at least one energy accumulator C is charged by first conversion circuit 5 during a system start-up and ultimately controlled to a defined voltage value, first conversion circuit 5 increasing the level of supply voltage UB, which resides within the range of approximately 6V to 18V, to a specified ignition voltage level, which, depending on the specific embodiment, is within the range of approximately 24V to 25V, respectively within the range of 33V to 35V. In the case of a short circuit to positive supply voltage UB of the vehicle in a feedback line of ignition element ZP in one of ignition circuits 20, 30, no ignitable current flows back into the at least one energy accumulator C, since first coupling diode D1 configured between the at least one energy accumulator C and the at least one ignition circuit 20, 30 is blocking. However, if first coupling diode D1 is defective and is not able to block, a false activation of ignition element ZP may occur. Such a short circuit to positive supply voltage UB of the vehicle in one of ignition circuits 20, 30 is recognized in all of the known occupant safety systems. It is possible that related art systems do not recognize a short circuiting of first coupling diode D1, respectively an absent blocking behavior of first coupling diode D1. Therefore, an unrecognized, respectively "sleeping" defect of first coupling diode D1 that is not displayed, may lead to false activation upon system start-up in the case that such a short circuit to positive supply voltage UB of the vehicle is present at a minus side of ignition element ZP in one of ignition circuits 20, 30.

The prerequisite for the inventive recognition of coupling faults in an ignition circuit supply circuit 10 is met by the general use of the redundant double supplying of the at least one ignition circuit 20, 30 via the at least one energy accumulator C and/or positive supply voltage UB of the vehicle. In addition, through the inventive use of charging circuit 12 between first conversion circuit 5 and the at least one energy accumulator C, as well as of discharging circuit 16 between the at least one energy accumulator C and ground, the state of charge, respectively charging voltage VER of the at least one energy accumulator C in the case of a started system is rendered controllable via evaluation and control unit μC in controller 3, and a condition that suffices for recognizing coupling faults is thereby devised. Controller 3 is constituted of an airbag controller, for example, that performs and monitors the activation, respectively ignition of restraint means configured as airbags in the occupant safety system.

Normally, state of charge VER, respectively the energy reserve voltage in the at least one energy accumulator C is rapidly depleted by the autonomous supply in the case of an unenergized controller 3; charge stage VER, respectively the energy reserve voltage being generally depleted in the at least one energy accumulator C within a time span of approximately 10 s. The rapid depletion is substantially slowed once a RESET state of controller 3 sets in, which is characterized in that input voltage VUP of second conversion circuit 7 is below a specified minimum value of approximately 9V. Besides other minor loads and leakages, discharging circuit 16 automatically assumes the task of further discharging in the RESET state.

If controller 3 is restarted, then the at least one energy accumulator C initially remains in the uncharged state. The at least one energy accumulator C is first charged with the desired charging current by controllable charging circuit 12 in response to the command from evaluation and control unit μC. If first coupling diode D1 in ignition-circuit supply circuit 10 is defective and is not able to block, then, independently of charging circuit 12 and via second coupling device D2, the at least one energy accumulator C is then rapidly charged with high current from positive supply voltage UB of the vehicle. To recognize such a defect, respectively fault of first coupling diode D1, respectively to test supply circuit 10 according to the present invention, controllable charging circuit 12 remains deactivated from the system start-up until completion of the supply voltage test, and the at least one energy accumulator C is disconnected from first conversion circuit 5; following the system start-up, a state of charge VER_start of the at least one energy accumulator C being ascertained. State of charge VER of energy accumulator C may be captured by evaluation and control unit μC of controller 3, for example by a voltage divider and an analog-digital converter of evaluation and control unit μC. Ascertained state of charge VER_start of the at least one energy accumulator C is compared to at least one specified threshold value UB_min, UB_max, V_min; as a function of the at least one comparison, a faultless supply circuit 10 or at least one fault being recognized. In this case, specified threshold value UB_min corresponds to a lower operating voltage limit of controller 3, reduced by a maximum diode voltage of approximately 1V. Specified threshold value UB_max corresponds to an upper operating voltage limit of controller 3, reduced by a minimum diode voltage of approximately 0V; and V_min corresponds to a minimum operating voltage limit of second conversion circuit 7.

FIG. 3 shows various ranges A, B, C, D for state of charge VER_start of the at least one energy accumulator C that are defined by specified threshold values UB_min, UB_max, V_min. In the illustrated exemplary embodiments, state of charge VER of the at least one energy accumulator C is determined by the energy reserve voltage that is measurable at the at least one energy accumulator C. As is readily apparent from FIG. 3, a first voltage range A is upwardly limited by a first threshold value UB_min that is determined by a minimum value of supply voltage UB. A second voltage range B is downwardly limited by first threshold value UB_min and upwardly limited by a third threshold value V_min that represents the minimum value of input voltage VER of second conversion circuit 7. A third voltage range C is downwardly limited by third threshold value V_min and upwardly limited by a second threshold value UB_max that represents the maximum value of supply voltage UB; and a fourth voltage range D is downwardly limited by second threshold value UB_max.

Evaluation and control unit μC of controller 3 recognizes a faultless supply circuit 10 when ascertained state of charge VER_start of the at least one energy accumulator C falls below first threshold value UB_min. This means that ascertained state of charge VER_start of the at least one energy accumulator C resides within first voltage range A. If ascertained state of charge VER_start of the at least one energy accumulator C is below first threshold value UB_min, then no fault exists since, in the case of a defect, respectively fault of coupling diode D1, the at least one energy accumulator C is charged via second coupling diode D2 at least with the minimum value of supply voltage UB that is reduced by the value of a forward voltage of second coupling diode D2. Since the minimum value of supply voltage UB corresponds to approximately 6V, first threshold value UB_min is defined as approximately 5V, for example.

If the ascertained state of charge VER_start of the at least one energy accumulator C resides in fourth voltage range D above second threshold value UB_max, then evaluation and control unit μC of controller 3 recognizes a fault in the area of second conversion circuit 7 and/or a warm reset error in the controller. The autonomous behavior of controller 3 was therefore not in order, since, otherwise, the reverse direction would induce a discharging of state of charge VER_start of energy accumulator C via charging circuit 12, respectively reverse diode 14, below the minimum value of input voltage VUP of second conversion circuit 7 of approximately 9V, for example, which corresponds to a minimum voltage level at which the operating voltages for controller 3 are no longer feasible, and controller 3 changes to a reset state. Since, moreover, for supply voltage UB provided by the vehicle electrical system, no values may occur that are above the upper limiting value, i.e., the maximum value of supply voltage UB of approximately 18V, there is no discernible fault in first coupling diode D1 when ascertained state of charge VER_start of the at least one energy accumulator C is above second threshold value UB_max of approximately 18V.

If ascertained state of charge VER_start of energy accumulator C in third voltage range C is between third threshold value V_min of approximately 9V and second threshold value UB_max of approximately 18V, then evaluation and control unit μC of controller 3 either recognizes a fault in first coupling diode D1 or in second conversion circuit 7, respectively in the reset structure of controller 3. If ascertained state of charge VER_start of the at least one energy accumulator C resides in second voltage range B between first threshold value UB_min of approximately 5V and third threshold value V_min of approximately 9V, then evaluation and control unit μC of controller 3 may recognize a defect, respectively fault in first coupling diode D1 or no fault in supply circuit 10, since this circumstance may be attributed to a harmless rapid OFF-ON supply cycle. In this case, once the minimum value of input voltage VUP of second conversion circuit 7 that corresponds to third threshold value V_min is not met, a subsequent reset procedure of controller 3 prevents a further discharging of the at least one energy accumulator C in that the controller supply is switched on again. To verify the defect, respectively fault of first coupling diode D1 in second and third voltage range B, C, state of charge VER_start of the at least one energy accumulator C is reduced by discharging circuit 16 in a second step. Discharging circuit 16 may specify a discharging current within a range of approximately 10 mA to 100 mA, for example. If state of charge VER_start of the at least one energy accumulator C is able to be sufficiently reduced, and, once the discharging time period has elapsed, a charge difference of VER_delta is ascertained, then no defect or fault is present in the first coupling diode.

This means that evaluation and control unit μC of controller 3 activates discharging circuit 16 for a specified period of time when ascertained state of charge VER_start of the at least one energy accumulator C resides between first threshold value UB_min and third threshold value UB_max. Once the specified time period has elapsed, evaluation and control unit μC of controller 3 then determines new state of charge VER of the at least one energy accumulator C.

Evaluation and control unit μC of controller 3 recognizes a defective first coupling diode D1 when, once the specified time period has elapsed, no reduction in the state of charge VER_delta is ascertained. Evaluation and control unit μC of controller 3 recognizes a faultless supply circuit 10 when, once the specified time period has elapsed, a reduction in state of charge VER_delta is ascertained, and state of charge VER_start of the at least one energy accumulator C ascertained at the system start-up resides between first threshold value UB_min and third threshold value V_min. Evaluation and control unit μC of controller 3 recognizes a faulty second conversion circuit 7 or a warm reset error in the control unit when, once the specified time period has elapsed, a reduction in state of charge VER_delta is ascertained, and state of charge VER_start of the at least one energy accumulator C ascertained at the system start-up resides between third threshold value V_min and second threshold value UB_max.

Figure 5:
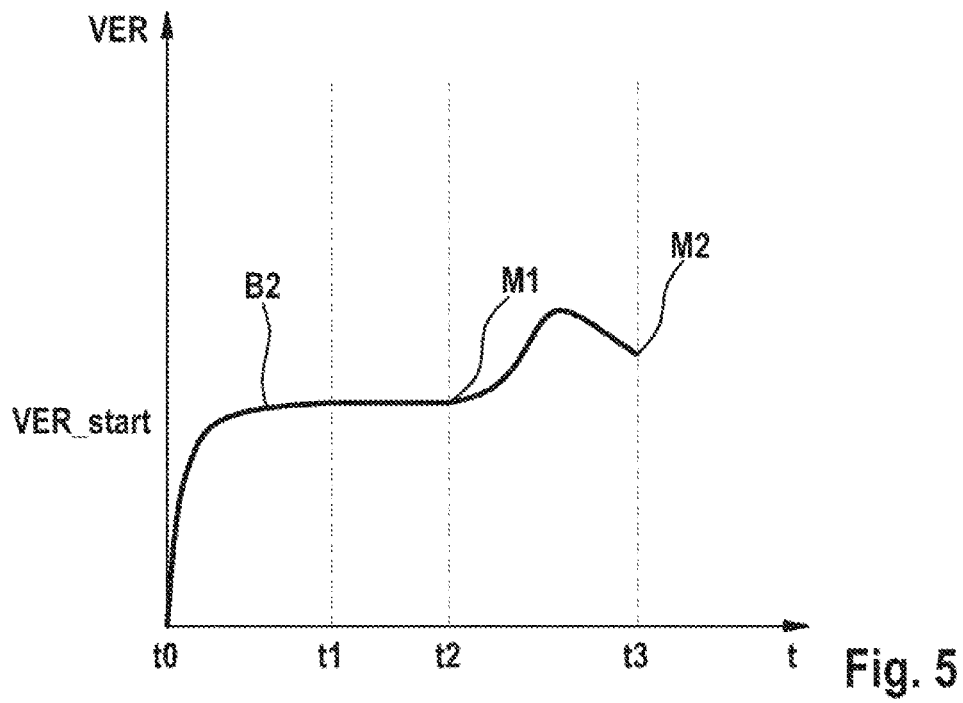

FIG. 4 shows a first characteristic curve B1 of state of charge VER of the at least one energy accumulator C of supply circuit 10 according to the present invention; and FIG. 5 shows a second characteristic curve B2 of state of charge VER of the at least one energy accumulator C of supply circuit 10 according to the present invention. In the case of plotted characteristic curves B1, B2, state of charge VER_start of the at least one energy accumulator C ascertained at the system start-up resides in second voltage range B between first threshold value UB_min and third threshold value V_min. In the case of plotted characteristic curves B1, B2, a first point in time t0 corresponds to a start of the supplying of controller 3. A second point in time t1 corresponds to a release of the reset state of controller 3. At a third point in time t2, evaluation and control unit μC of controller 3 performs a first measurement M1 for determining state of charge VER_start of the at least one energy accumulator ER at the system start-up. In the case of plotted characteristic curves B1, B2 and ascertained state of charge VER_start of the at least one energy accumulator C in second voltage range B, evaluation and control unit μC of controller 3 may recognize a defect, respectively fault in first coupling diode D1 or no fault in supply circuit 10, since this circumstance may be attributed to a harmless rapid OFF-ON supply cycle. For purposes of differentiation, evaluation and control unit μC of controller 3 activates discharging circuit 16 at third point in time t2 in order to reduce the state of charge of the at least one energy accumulator C up to a fourth point in time t3. At fourth point in time t3, evaluation and control unit μC of controller 3 performs a second measurement M2 for determining current state of charge VER of the at least one energy accumulator C and checks whether there is a reduction in state of charge VER_delta.

First characteristic curve B1 plotted in FIG. 4 reveals that evaluation and control unit μC of controller 3 is able to ascertain a reduction in state of charge reduction VER_delta, so that evaluation and control unit μC of controller 3 recognizes a faultless supply circuit 10.

Second characteristic curve B2 plotted in FIG. 5 reveals that evaluation and control unit μC of controller 3 is not able to ascertain a reduction in state of charge VER_delta, since discharging circuit 16 was not able to reduce the state of charge. Therefore, evaluation and control unit μC of controller 3 recognizes a fault, respectively defect in first coupling diode D1.

Figure 6:
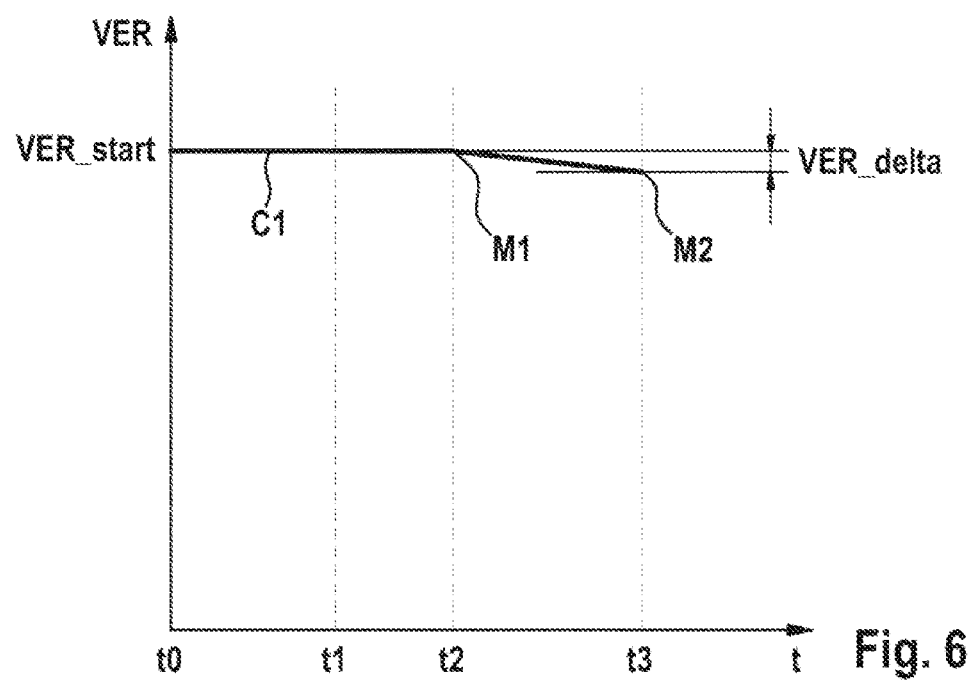
Figure 7:
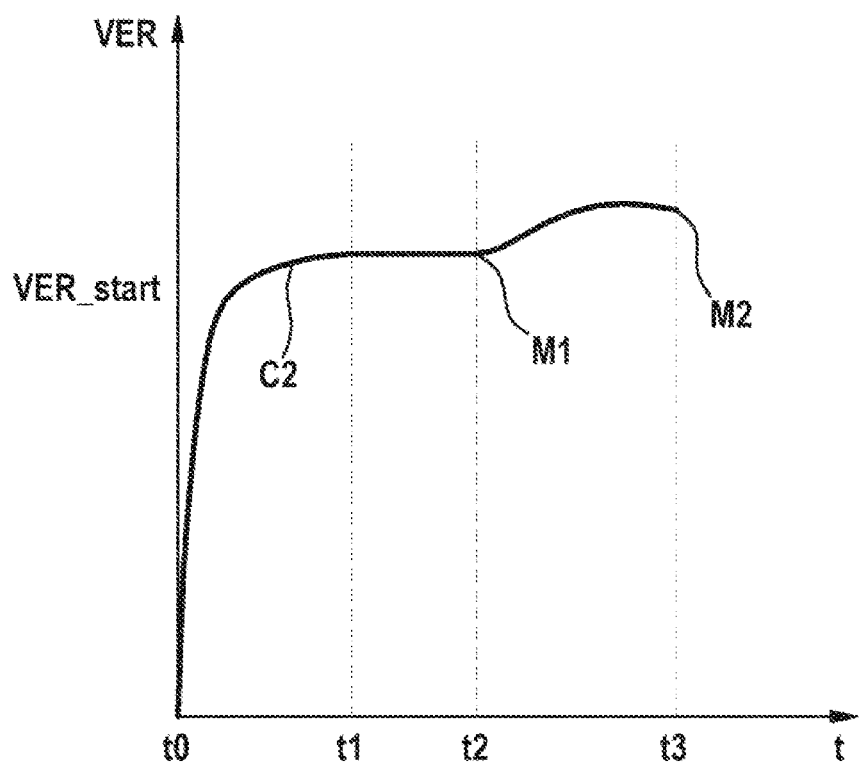

FIG. 6 shows a third characteristic curve C1 of state of charge VER of the at least one energy accumulator C of supply circuit 10 according to the present invention; and FIG. 7 shows a fourth characteristic curve C2 of state of charge VER of the at least one energy accumulator C of supply circuit 10 according to the present invention. In the case of plotted characteristic curves C1, C2, state of charge VER_start of the at least one energy accumulator C ascertained at the system start-up resides in third voltage range C between third threshold value V_min and second threshold value UB_max. In the case of plotted characteristic curves C1, C2, a first point in time t0 corresponds to the start of the supplying of controller 3, analogously to the characteristic diagrams of FIG. 4 or 5. A second point in time t1 corresponds to the release of the reset state of controller 3. At third point in time t2, evaluation and control unit μC of controller 3 performs first measurement M1 for determining state of charge VER_start of the at least one energy accumulator C at the system start-up. In the case of plotted characteristic curves C1, C2 and ascertained state of charge VER_start of the at least one energy accumulator C in third voltage range C, evaluation and control unit μC of controller 3 may recognize a defect, respectively fault in first coupling diode D1 or a fault in second conversion circuit 7 or in the reset structure of controller 3. For purposes of differentiation, evaluation and control unit μC of controller 3 activates discharging circuit 16 at third point in time t2 in order to reduce the state of charge of the at least one energy accumulator C up to a fourth point in time t3. At fourth point in time t3, evaluation and control unit μC of controller 3 performs second measurement M2 for determining current state of charge VER of the at least one energy accumulator C and checks whether a reduction in state of charge VER_delta is present.

Third characteristic curve C1 plotted in FIG. 6 reveals that evaluation and control unit μC of controller 3 is able to ascertain a reduction in state of charge VER_delta, so that evaluation and control unit μC of controller 3 recognizes a fault in second conversion circuit 7 or in the reset structure of controller 3.

Second characteristic curve B2 plotted in FIG. 7 reveals that evaluation and control unit μC of controller 3 is not able to recognize a reduction in state of charge VER_delta, since discharging circuit 16 was not able to achieve any reduction in state of charge VER. Therefore, evaluation and control unit μC of controller 3 recognizes a fault, respectively defect in first coupling diode D1.

Evaluation and control unit μC of controller 3 may output the ascertained fault states, respectively the ascertained faultless states to the user via suitable optical and/or acoustic display means.

Specific embodiments of the present invention provide a method according to the present invention for testing a supply circuit for at least one ignition circuit, as well as a supply circuit for at least one ignition circuit that are advantageously able to check the blocking ability of reverse-polarity protection elements, respectively of coupling diodes in the ignition-circuit supply circuit and, in the event of a fault, display the same. This makes it advantageously possible to prevent the risk of erroneous activation without a previous fault indication.

What is claimed is:

1. A method for testing a supply circuit for at least one ignition circuit which includes at least one energy accumulator, a first conversion circuit which raises a supply voltage to a specified voltage level and charges the at least one energy accumulator, and a controllable discharging circuit which selectively discharges the at least one energy accumulator, the at least one energy accumulator being connected via a first coupling diode to the at least one ignition circuit, and the supply voltage being applied via a second coupling diode to the at least one ignition circuit, the method comprising:
    maintaining a controllable charging circuit in deactivated state from the time of system start-up until completion of a supply voltage test such that the at least one energy accumulator is disconnected from the first conversion circuit;
    following the system start-up, ascertaining a state of charge of the at least one energy accumulator and comparing the state of charge to the at least one specified threshold value; and
    ascertaining, as a function of the comparison, one of a faultless coupling of the supply circuit or at least one fault.

2. The method as recited in claim 1, wherein a faultless coupling of the supply circuit to the at least one ignition circuit is recognized when the ascertained state of charge of the at least one energy accumulator falls below a first threshold value.

3. The method as recited in claim 2, wherein the first threshold value is specified on the basis of a minimum value of the supply voltage.

4. The method as recited in claim 2, wherein one of a faulty second conversion circuit or a warm reset error is recognized when the ascertained state of charge of the at least one energy accumulator exceeds a second threshold value.

5. The method as recited in claim 4, wherein the second threshold value represents a maximum value of the supply voltage.

6. The method as recited in claim 4, wherein the discharging circuit is activated for a specified period of time when the ascertained state of charge of the at least one energy accumulator is between the first threshold value and the second threshold value, and after the specified time period has elapsed, the state of charge of the at least one energy accumulator is newly ascertained.

7. The method as recited in claim 6, wherein a defective first coupling diode is recognized when, after the specified time period has elapsed, no reduction in the state of charge is ascertained.

8. The method as recited in claim 6, wherein a faultless supply circuit is ascertained when, after the specified time period has elapsed, a reduction in the state of charge is ascertained, and the state of charge of the at least one energy accumulator ascertained at the system start-up is between the first threshold value and a third threshold value.

9. The method as recited in claim 6, wherein one of a faulty second conversion circuit or a warm reset error is recognized when, after the specified time period has elapsed, a reduction in state of charge is ascertained, and the state of charge of the at least one energy accumulator ascertained at the system start-up is between a third threshold value and the second threshold value.

10. The method as recited in claim 8, wherein the third threshold value represents a minimum value of an input voltage of the second conversion circuit.

11. A supply circuit for at least one ignition circuit, comprising:
    at least one energy accumulator;
    a first conversion circuit which raises a supply voltage to a specified voltage level and charges the at least one energy accumulator;
    a first coupling diode provided between the at least one energy accumulator and the at least one ignition circuit;
    a second coupling diode, wherein a supply voltage is applied via the second coupling diode to the at least one ignition circuit; and
    a controllable discharging circuit selectively discharging the at least one energy accumulator, wherein the controllable discharging circuit is looped in between the first conversion circuit and the at least one energy accumulator;
    wherein a reverse diode is configured in parallel to the controllable charging circuit that redundantly connects the at least one energy accumulator to a second conversion circuit which, from an input voltage, generates at least one operating voltage for a controller.

12. The supply circuit as recited in claim 11, wherein an evaluation and control unit drives at least one of the charging circuit and the discharging circuit to at least one of selectively charge and discharge the at least one energy accumulator.

13. The supply circuit as recited in claim 12, wherein the evaluation and control unit is configured to perform a method for testing the supply circuit for the at least one ignition circuit.

14. An ignition system for an occupant safety system, comprising:
at least one ignition circuit; and
a supply circuit for the at least one ignition circuit, the supply circuit including:
at least one energy accumulator;
a first conversion circuit which raises a supply voltage to a specified voltage level and charges the at least one energy accumulator;
a first coupling diode provided between the at least one energy accumulator and the at least one ignition circuit;
a second coupling diode, wherein a supply voltage is applied via the second coupling diode to the at least one ignition circuit; and
a controllable discharging circuit selectively discharging the at least one energy accumulator, wherein the controllable discharging circuit is looped in between the first conversion circuit and the at least one energy accumulator;
wherein a reverse diode is configured in parallel to the controllable charging circuit that redundantly connects the at least one energy accumulator to a second conversion circuit which, from an input voltage, generates at least one operating voltage for a controller.

15. The ignition system as recited in claim 14, wherein an evaluation and control unit drives at least one of the charging circuit and the discharging circuit to at least one of selectively charge and discharge the at least one energy accumulator.

16. The ignition system as recited in claim 15, wherein the evaluation and control unit is configured to perform a method for testing the supply circuit for the at least one ignition circuit.

17. The ignition system as recited in claim 14, wherein a faultless coupling of the supply circuit to the at least one ignition circuit is recognized when the ascertained state of charge of the at least one energy accumulator falls below a first threshold value.

18. The ignition system as recited in claim 17, wherein the first threshold value is specified on the basis of a minimum value of the supply voltage.

19. The ignition system as recited in claim 17, wherein one of a faulty second conversion circuit or a warm reset error is recognized when the ascertained state of charge of the at least one energy accumulator exceeds a second threshold value.

20. The ignition system as recited in claim 19, wherein the second threshold value represents a maximum value of the supply voltage.

21. The ignition system as recited in claim 19, wherein the discharging circuit is activated for a specified period of time when the ascertained state of charge of the at least one energy accumulator is between the first threshold value and the second threshold value, and after the specified time period has elapsed, the state of charge of the at least one energy accumulator is newly ascertained.

22. The ignition system as recited in claim 21, wherein a defective first coupling diode is recognized when, after the specified time period has elapsed, no reduction in the state of charge is ascertained.

23. The ignition system as recited in claim 21, wherein one of a faulty second conversion circuit or a warm reset error is recognized when, after the specified time period has elapsed, a reduction in state of charge is ascertained, and the state of charge of the at least one energy accumulator ascertained at the system start-up is between a third threshold value and the second threshold value.

24. The ignition system as recited in claim 21, wherein a faultless supply circuit is ascertained when, after the specified time period has elapsed, a reduction in the state of charge is ascertained, and the state of charge of the at least one energy accumulator ascertained at the system start-up is between the first threshold value and a third threshold value.

25. The ignition system as recited in claim 24, wherein the third threshold value represents a minimum value of an input voltage of the second conversion circuit.

* * * * *